Sept. 16, 1952     A. V. BRIEGHEL-MÜLLER     2,610,929
DEFECATING PROCESS AND APPARATUS Filed Aug. 2, 1950                                      3 Sheets-Sheet 1

INVENTOR
Arne Vigand Brieghel-Müller
BY
Arthur Middleton
ATTORNEY

INVENTOR
Arne Vigand Brieghel-Müller
BY
Arthur Middleton
ATTORNEY

Sept. 16, 1952  A. V. BRIEGHEL-MÜLLER  2,610,929
DEFECATING PROCESS AND APPARATUS
Filed Aug. 2, 1950  3 Sheets-Sheet 3
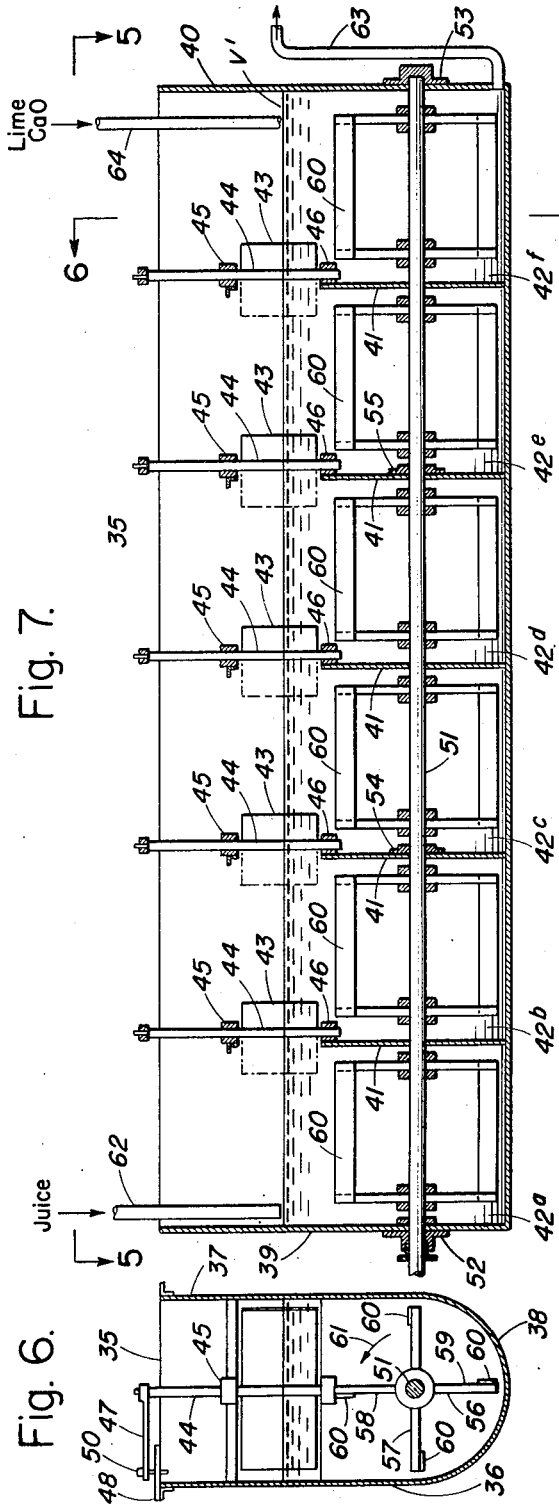
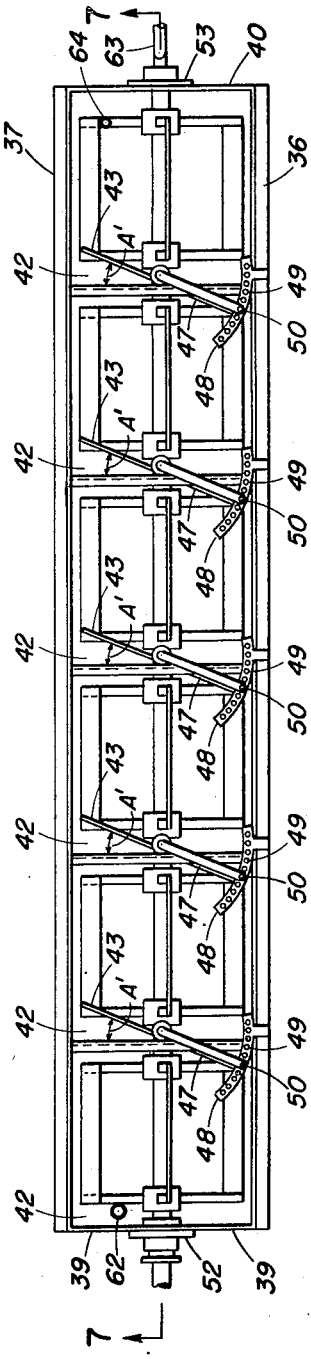
INVENTOR
Arne Vigand Brieghel-Müller
BY
Arthur Middleton
ATTORNEY Patented Sept. 16, 1952

2,610,929

UNITED STATES PATENT OFFICE 2,610,929

DEFECATING PROCESS AND APPARATUS

Arne Vigand Brieghel-Müller, Gentofte, Denmark, assignor to Aktieselskabet De Danske Sukkerfabrikker, Copenhagen, Denmark, a corporation of Denmark Application August 2, 1950, Serial No. 177,156
In Denmark August 24, 1949

7 Claims. (Cl. 127—14)

1

This invention relates to the clarification of raw sugar juice, more particularly to the treatment of the juice with a defecating agent, for example lime, that is the step of adding small critical quantities of the agent or lime to the juice in order to condition it for clarification which effects removal of suspended solids therefrom. More particularly this relates to effecting what may herein be termed the liming treatment in a continuous manner and under controlled conditions whereby the lime is to be added progressively in small quantities.

The method of continuous liming of sugar juice is exemplified in the well-known Dedek method where the juice passes through a series of compartments under agitation, while a fraction of the total critical amount of lime required is continuously being added to each respective compartment.

An objection to adding even small quantities of lime at a time to the juice is that there will occur local overliming, that is overconcentration of lime, at the point of introduction of the lime into the juice, overliming being particularly objectionable in such a case as this where the total quantity of lime to be imparted to the juice is very small relative to the juice volume and is of a critical order. Hence it has been a longstanding problem especially where the total amount of the dosing agent or lime is very small as compared with the volume of juice, to minimize overconcentration or overliming.

One object of this invention is to improve continuous liming methods, for example the Dedek method, so that overliming even locally is minimized or avoided.

This object is attainable by substantially avoiding the addition directly even of small quantities at a time of lime to the juice, namely by mixing raw juice with juice already containing a quantity of lime, and then to mix this mixture with juice containing a still greater quantity of lime, and so on until the liquid will have acquired a concentration of lime therein high enough to have the lime or dosing solution added directly thereto under conditions which discourage and minimize the tendency towards local overconcentration.

At any rate, it is desirable that the dosing agent or solution be added progressively to the liquid being treated and in such a manner that the content or concentration of the agent in the liquid will increase as uniformly as possible throughout its entire volume, this being of particular importance where the liquid is to receive only a relatively slight amount of the dosing agent. Thus local high concentration of the agent may be avoided, such as may occur when the agent is directly added even though in small amounts, or added in the form of a solution or mixture of relatively high concentration.

It is an object of this invention to minimize the undesirable effects attendant upon the direct addition of the dosing agent as lime. To this end the invention proposes that the fresh liquid to be treated be mixed with such liquid containing some of the dosing agent, the resulting mixture then be mixed with a liquid containing a greater amount of the dosing agent, and so on until the liquid will have attained such a concentration of the dosing agent therein, that the agent may be added directly to the liquid for instance in the form of a solution of suitable concentration, without incurring an objectionably high degree of overconcentration. The number of mixing stages to be employed in such a system of progressive dosing will depend upon the particular circumstances of the individual case or process involved. That is to say, in some instances two stages may suffice with fresh liquid being mixed with liquid already containing a quantity of the agent, and a further quantity of the agent then being added directly until the required concentration will have been attained, while in other instances a much greater number of stages must be used.

A more specific object is to provide apparatus for continuously mixing a liquid with one or more substances, with the substance to be progressively added so that the content and concentration of the substance will increase relatively uniformly in the manner just outlined, in which the stagewise mixing is effected automatically and without the need of complicated dosing means.

That object is attained by providing a horizontal series of communicating chambers or mixing zones with an inlet for the fresh liquid or raw juice at one end of the series, and an outlet for the dosed liquid or limed juice at the other end of the series so that a main flow of liquid passes from end to end of the series; and further providing agitating or stirring devices for setting up in each chamber liquid flow transversely of the main flow; and providing retransfer means for automatically returning mixed more highly dosed liquid from any one chamber into less highly dosed liquid in the adjoining upstream chamber. To this end a horizontally extending tank is subdivided by a plurality of transverse submerged partitions into a series of chambers or compartments, with stirring and mixing devices for each compartment for inducing transverse flows of liquid in the compartments. Each partition is associated with a flow-diverting or flow-splitting baffle, for example in the form of a damper-like positionable vane or blade disposed at an angle relative to the plane of the partition as well as at an angle relative to the direction of induced transverse movement of the liquid in the respective compartments.

As the liquid follows its general or main path from the inlet end to the outlet end of the tank and across the interposed partitions, the intercepting or flow-splitting function of the vanes combined with the transverse-flow inducing function of the agitating devices is to return a portion of more highly dosed liquid or more highly limed juice from a mixing compartment or zone into the somewhat less highly dosed liquid or less limed juice of the adjoining upstream compartment. Thus a portion of juice of higher lime dosage is being diverted and retransferred in an upstream direction by the respective flow-splitting vane extending a distance into the path of the transversely moving juice in a compartment, while mixed juice of lower lime dosage flows or is being displaced in a downstream direction from the compartment.

In this way, according to the invention, a portion of the liquid is urged in an upstream direction continuously and in a sustained manner, that is in a direction towards the inlet end of the tank, by virtue of the recirculation induced between respective mixing compartments. With such flow conditions being maintained by the functioning of the apparatus, the invention proposes to add the dosing agent or lime directly to the body of liquid or juice in transit through the tank at a point which is disposed a significant distance apart and downstream from the inlet end, for example in the last downstream mixing compartment, with the net result that liquid entering the last compartment will contain nearly the required amount of dosing agent, while the next preceding chamber will contain the agent in somewhat lower concentration, and so on to the first or inlet chamber where the concentration may be slight or negligible. With such continuous flow being maintained in and through the tank, there will thus nevertheless be discerned a gradient of concentrations with a value of that gradient assigned to or maintained in each of the successive mixing compartments, as the highest concentration is encountered in the outlet compartment and the lowest concentration in the inlet compartment, and various intermediate concentrations being established in the intermediate compartments. Thus, even though the dosing agent or lime be added directly at the outlet end of the tank, its concentration in the body of liquid present at any one time in the tank as a whole increases uniformly and gradually from the inlet end to the outlet end. Indeed the tendency towards overconcentration is minimized at the point of introduction of the dosing agent inasmuch as the liquid at that point will already have attained a highly uniform and nearly completed concentration of dosing agent therein.

Thus it will be seen that when the dosing agent is added to the liquid some distance apart from the point of liquid supply or inlet, part of the more concentrated solution or mixture of the liquid and of agent or lime formed at this point will be led towards the liquid inlet and thereby mixed with liquid to which the agent has not been directly added, so that there a zone will be established, in which the concentration is lower than in the vicinity of the point where the agent is added. From said zone a part of the liquid may be further advanced towards the point of supply so as to establish another zone of still lower concentration and so on. From the point on where the agent is added and in the direction opposite to that of the main flow through the compartments a uniformly decreasing concentration or gradient of concentrations of the agent will thus be established in the tank.

According to one feature, when the tank is subdivided by partitions into compartments interconnected by means of overflow or by connecting apertures in the partitions, the flow-splitting means between mixing compartments to effect recirculation of mixed liquid from a compartment to the adjoining upstream compartment, comprise a damper-like shutter turnable about a vertical axis, such shutter being associated with the respective partition by being disposed directly above the respective partition or in an aperture therein. These shutters have means for adjusting the setting of their angular position, which adjustable setting makes it possible to control the rate of recirculation of liquid from a compartment to the adjoining upstream compartment. That is to say, by adjusting the angle between the shutter and the direction of the induced transverse flows in the compartments, the amount of liquid may be varied which by the flow-splitting effect of the shutter is compelled to flow from one mixing zone into the preceding zone in opposition to the direction of the main stream. Thus, while a mainstream of liquid or juice continues flowing from inlet to outlet of the tank, localized recirculation of juice is being effected concurrently in any pair of compartments, as more highly limed mixed juice from the downstream compartment is being urged into the adjoining upstream compartment and a corresponding quantity of mixed juice of lower lime content is being displaced into the downstream compartment.

Moreover according to this invention, in the event of a shutdown or stoppage of flow into the tank, all such shutters normally serving to effect recirculation, may be closed so as to shut the communication of the compartments between one another. In this way one is enabled, in case of interruption of the operation, to maintain the allotted concentrations of the liquid remaining in the respective compartments. Such a measure of shutting off the compartments against one another is to prevent the concentrations in the respective compartments to become equalized through the communications between the compartments, and in this way by maintaining the status quo of concentrations inconvenience is avoided when restarting the operation of the tank.

The provision of shutters of the two-bladed or double-wing damper type allows for liquid to pass from a downstream compartment into the adjoining upstream compartment without any appreciable short circuiting into that portion of the liquid which simultaneously passes in a main flow downstream direction from the upstream compartment. That is to say, some liquid passes upstream by way of one wing of the shutter acting as a feed splitter, while the main flow liquid passes from the upstream compartment to the adjoining downstream compartment by way of the other wing of the shutter. Also because of the pressures of the liquid upon both wings of the shutter substantially balancing each other, there is little or no tendency for the shutters to become rotatably displaced, and by the same token little effort is required for effecting their angular adjustment.

According to one feature the stirring device for the mixing chambers comprises a horizontal rotary shaft which extends through and is submerged in the body of liquid or juice in the tank, the shaft being provided with paddle elements moving in repetitive circular paths within the body of juice when the shaft is rotated. The direction of rotation of the paddle elements is such as to set up motion of liquid in the respective chambers transversely of the shaft and so that a desired portion of the liquid is intercepted by one end portion or wing of the two-winged shutter in a flow-splitting manner whereby such portion of liquid is returned from a downstream mixing chamber into the adjoining upstream mixing chamber, while a corresponding portion of liquid is thereby displaced from the downstream chamber past the opposite end or wing of the shutter into the downstream chamber, this localized recirculation to continue as long as the operation continues normally that is as long as the supply of fresh liquid or juice to the tank as well as the supply of dosing agent to the tank continues. Upon stoppage of these or shutdown of the operation of the tank and of the mixing chambers, the shutters may be closed in such a manner that communication between respective chambers be interrupted and the then concentration of the dosing agent in the respective chambers be maintained as of the time of shutdown, with the result that upon restarting of the operation the status quo of the dosed liquid or limed juice passing from the tank be established at once.

Summarizing, the invention is represented by apparatus for liming sugar juices with gradually increasing concentration of the lime in the juice, which comprises a pair of adjoining mixing chambers through which the juice passes sequentially by way of a communication means between the chambers. Mixing means are provided for the chambers, as well as transfer means which are cooperatively associated with the communication means as with the mixing means for continuously and automatically returning a quantity of more highly limed juice in the upstream chamber for mixture therewith while displacing a quantity of mixed juice from the upstream chamber into the downstream chamber thereby maintaining recirculation of juice between said chambers, while a main stream of juice being treated continues passing through said chambers.

The invention is embodied in an apparatus which comprises a horizontally extending tank having a raw juice inlet at one end and a treated juice outlet at the other end. A plurality of transverse partitions are provided in the tank to constitute with the tank walls a series of mixing compartments having communication with one another at the top end portion of the partitions, through which compartments the juice must pass when flowing from the inlet to the outlet end of the tank. Mixing means are provided in said compartments, and cooperatively associated with respective mixing means and with respective partitions are liquid transfer means for continuously and automatically returning a quantity of mixed juice with higher lime content from any downstream compartment to the juice of lower lime content in the adjoining upstream compartment for mixture therewith while displacing a corresponding quantity of mixed juice from the upstream compartment into the downstream compartment thereby maintaining localized recirculation of juice within pairs of compartments adjoining one another, and means for introducing substantially all of the required lime into a downstream portion of the body of juice in the tank, so that during operation of the apparatus the concentration of lime in the body of juice in the tank decreases towards the inlet end of the tank due to the induced conditions of local recirculation between respective compartments.

In the drawings:

Fig. 5 is a plan view of an embodiment of a compartmented treatment tank implemented for the purpose of this invention, with a longitudinal submerged agitator shaft carrying sets of rotary paddle blades for respective compartments to effect mixing as well as transverse flows in the compartments.

Fig. 6 is a cross section taken on line 6—6 of Fig. 5.

Fig. 7 is a cross section taken on line 7—7 of Fig. 5.

Figure 1:
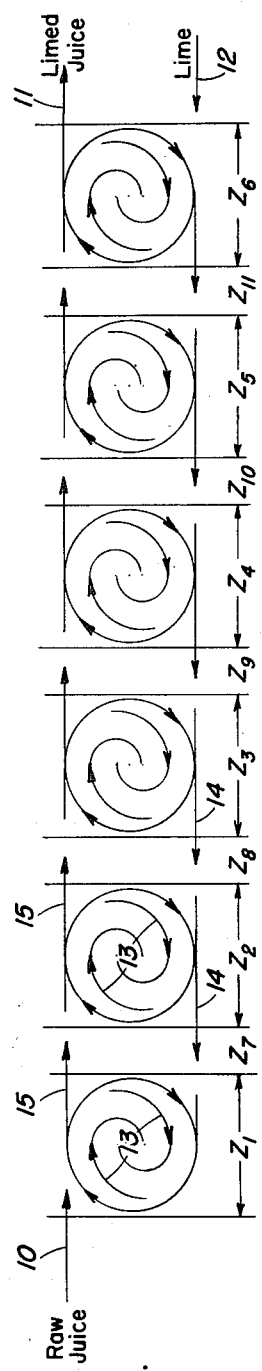
Fig. 1 is a highly abstract diagram of liquid flow conditions to be maintained in the apparatus according to this invention for obtaining gradual and uniformly progressive dosing of the liquid or liming of the juice passing through the apparatus, there being discerned in this diagram a series of mixing zones alternating with recirculation zones.

The Fig. 1 diagram presents the invention in an abstract manner by way of indicating such flow conditions as are to be maintained in the apparatus in order to attain the objects of this invention. In this diagram there can be discerned a series of mixing zones $Z_1$ to $Z_6$ alternating with recirculation zones $Z_7$ to $Z_{11}$, the recirculation zones being shown in lieu of means for effecting recirculation. Arrow-headed flow lines indicate the supply at the influent end of the series of sugar juice at 10, and the discharge by and from the effluent end of this series of limed juice at 11. Introduction of lime at the effluent end of the series is indicated by an arrow at 12. The detention and mixing of juice in the mixing zones is represented by swirl-indicating arrows 13. Arrows 14 leading into the recirculation zones indicate the retransfer of more highly limed mixed juice from any of the mixing and detention zones in an upstream direction into the respective adjoining mixing and detention zones for mixing with less highly limed juice therein, while arrows 15 leading from the recirculation zones indicate the displacement in a downstream direction of a quantity of less highly limed mixed juice from any one compartment for mixture with more highly limed juice in the respective adjoining downstream compartment.

Figure 2:
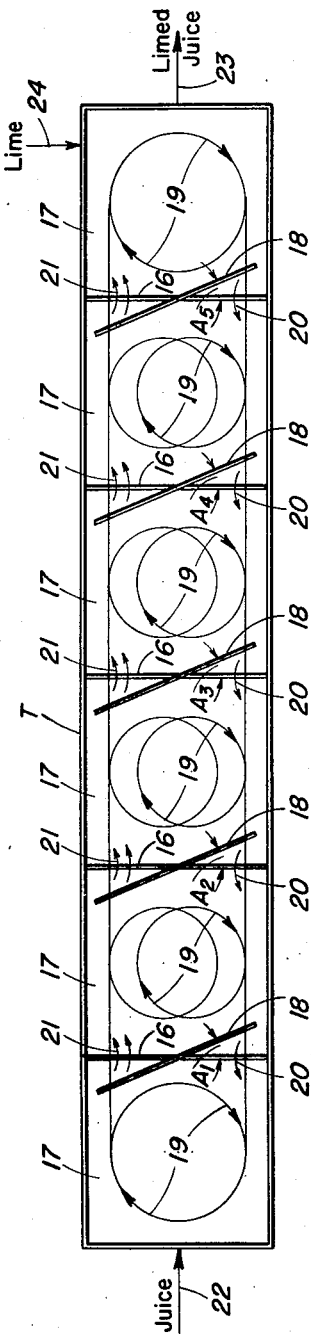
Fig. 2 shows the essence of the Fig. 1 flow conditions with implementation added thereto in the way of a diagrammatically shown compartmented treatment tank in plan view and liquid retransfer vanes shown between respective compartments.

Fig. 2 implements the Fig. 1 diagram by way of adding the diagrammatic plan view of a longitudinal horizontally extending trough-like tank T with transverse partitions 16 to provide detention and mixing compartments 17 corresponding to the mixing zones $Z_1$ to $Z_6$ of Fig. 1. Means for effecting the recirculation of juice between any of two mutually adjoining compartments 17, in lieu of the recirculation zones $Z_7$ to $Z_{11}$ in Fig. 1, are indicated by flow-splitting vanes or blades 18 associated with respective partitions 16 and disposed at suitable angles $A_1$ to $A_5$ with respect to the vertical planes of these partitions. Swirl-indicating arrows 19 in each compartment 17 indicate detention and mixing of the juice, with upstream-directed arrows 20 indicating the portion of juice continuously being transferred by the vanes 18 from any compartment 17 into the adjoining upstream compartment, and downstream-directed arrows 21 indicating the portion of juice that is continuously being displaced from any compartment into the adjoining downstream compartment. Fresh juice is shown at 22 to enter continuously into the upstream or influent end of the tank, while limed juice at 23 discharges continuously from the downstream or effluent end of the tank. Lime is indicated at 24 as being continuously fed into the tank at the downstream end thereof and at a carefully controlled rate.

Figure 3:
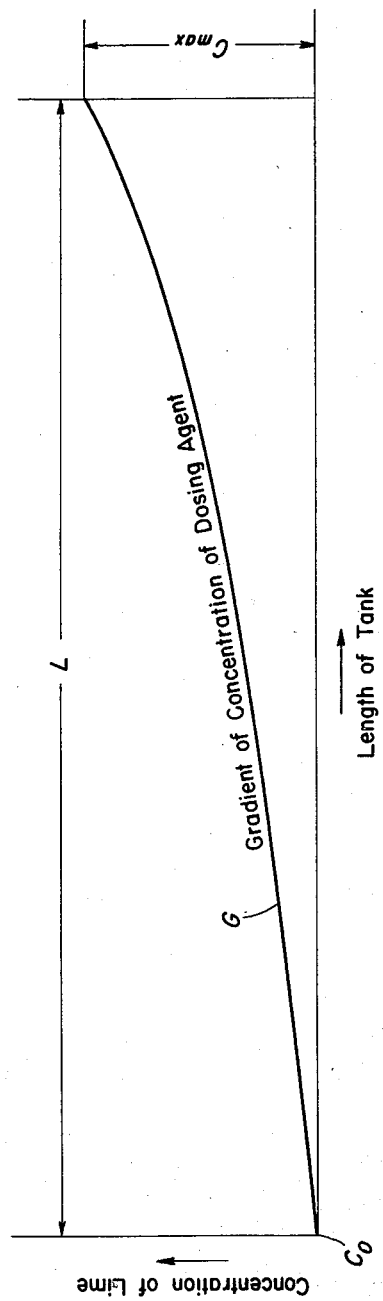
Fig. 3 is a chart coordinated in its scale to the Fig. 2 length of the treatment tank, the chart representing an example of a gradient of concentration of the dosing agent that maintains in the body of liquid in the tank while in operation.

With continuous operation and considering the condition of the body of juice as a whole in the tank, there is being established in that body of juice a gradient of concentration of the dosing agent or lime in the juice, which gradient may, by way of example, take the form of a line "G" in Fig. 3. The length of the gradient represented by that line as measured on the abscissa represents the length L of the tank of Fig. 2 which is the same as the total length of the series of zones in Fig. 1, with concentration-of-lime values measured on the ordinate. The characteristics of the gradient "G" depend more or less upon the angular setting of the vanes 18 and thus upon the rate of recirculation induced by the vanes between any two mutually adjoining compartments 17. In the representative gradient "G" shown in Fig. 3 the characteristics may be those of a substantially straight line having a zero value $C_0$ of concentration-of-lime at the upstream end of the tank and a maximum value $C_{max}$ of concentration-of-lime at the downstream end of the tank.

Figure 4:
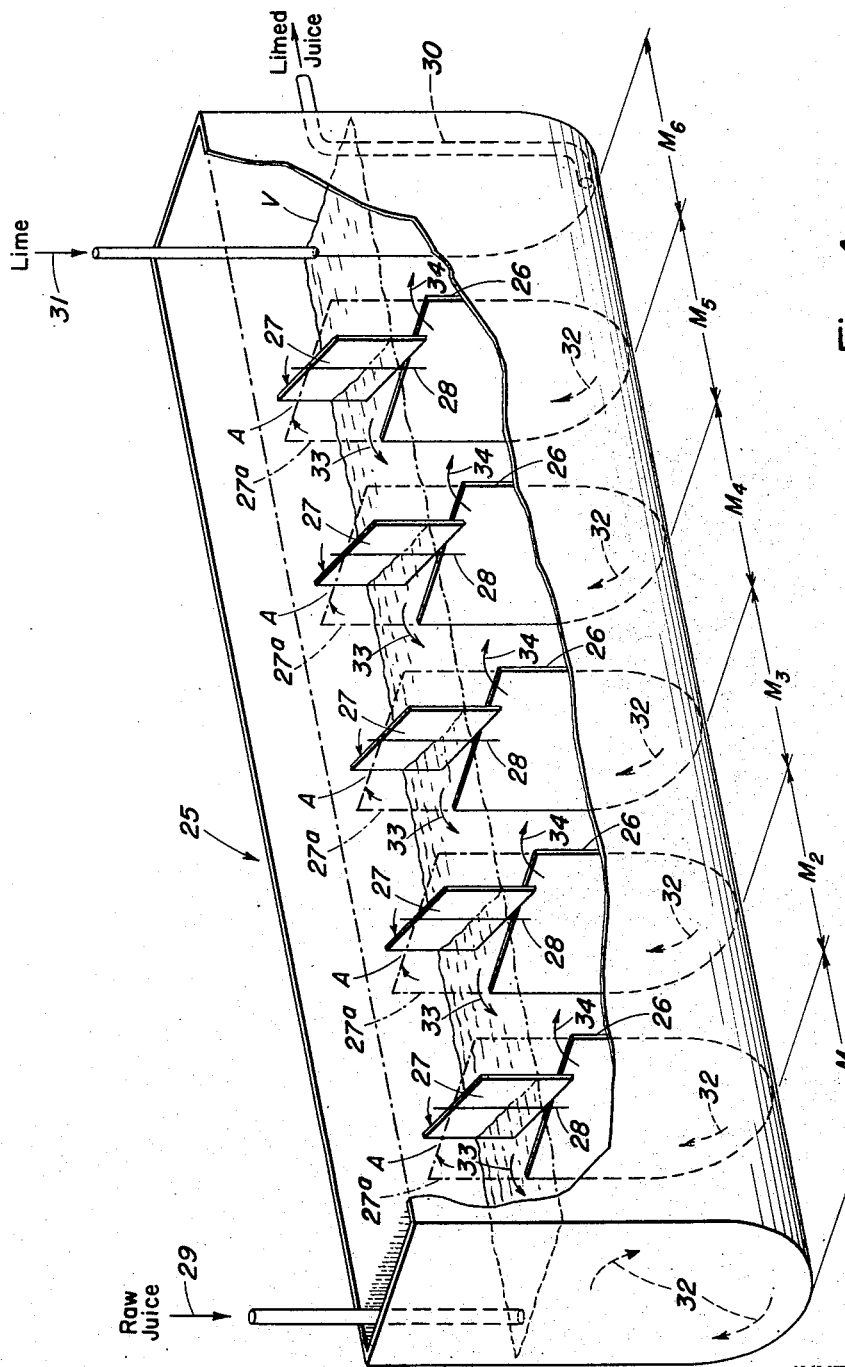
Fig. 4 is a perspective although diagrammatic view of the Fig. 2 implementation for further illustrating the flow conditions maintained in and by the apparatus during the operation thereof.

Fig. 4 presents a diagrammatic perspective view of the apparatus of Fig. 2 to further illustrate the flow conditions induced in the tank by the operation of this apparatus in accordance with this invention. Indeed, as here shown, the movement of the liquid in the individual mixing compartments is indicated as taking place in repetitive paths in vertical planes which extend transversely of the direction of the main end-to-end flow of liquid through the tank, the direction of these transverse flows being such that a desired portion of the liquid or juice is intercepted by respective flow-splitting vanes for recirculation from any one compartment into the adjoining upstream compartment.

In Fig. 4 a tank 25 is shown to be subdivided by submerged partitions 26 into a series of mixing and detention compartments $M_1$ to $M_6$ representing sequential detention or mixing zones.

Each partition has associated with the top end portion thereof a vane 27 adjustably turnable about a vertical axis 28, so as to constitute with the plane of the partition a desired angle A which is variable. The liquid level maintained in the tank is indicated at V making it clear that the partitions proper are submerged allowing for liquid flow communication between the compartments and past the vanes. However, there is also shown a dot-and-dash line position of the vanes whereby the communicating passages may be closed, indicated at $27^a$.

Incoming liquid or juice is indicated at 29 to feed continuously into compartment $M_1$ at the influent end of the tank, which compartment is herein termed the influent compartment; while limed juice is shown to pass continuously from compartment $M_6$ through an overflow pipe 30 at the effluent end of the tank, that compartment herein being termed the effluent compartment. The elevation of the overflow from pipe 30 determines the liquid level V in the tank. Lime or dosing agent is indicated at 31 as being fed continuously into the effluent compartment $M_6$. Arrows 32 indicate movement of liquid induced in the respective compartments by agitating means (not shown), such movement being in repetitive paths about a horizontal longitudinal axis of the tank and hence in planes extending transversely of the main end-to-end flow of liquid through the tank, such movement also being in that transverse direction which enables the vanes 27 to exercise their flow-splitting and liquid-recirculation function. Arrows 33 indicate the portions of liquid being intercepted and recirculated in an upstream direction by each vane, while arrows 34 indicate the portions of liquid that are being displaced in a downstream direction from any one compartment to the next.

Figs. 5, 6, and 7 represent the essence of the diagrammatic Fig. 4 structure although more fully implemented mainly with regard to the manner of mounting and the means for angular adjustment of the flow-splitting vanes, as well as with regard to the structure embodying the agitating and mixing means for the compartments.

A tank 35 in the general shape of a long, deep trough having vertical side walls 36 and 37, a bottom 38 of semi-circular cross-section merging with the side walls, and vertical end walls 39 and 40, is subdivided by partitions 41 into compartments $42^a$, $42^b$, $42^c$, $42^d$, $42^e$, and $42^f$, the compartment $42^a$ being the influent compartment and the compartment $42^f$ being the effluent compartment. Each partition 41 has associated therewith a vane or shutter blade 43 fixed to a vertical shaft 44 secured against vertical axial displacement and rotatable in a pair of bearings 45 and 46 one being vertically spaced from the other. At its upper end the shaft 44 has fixed thereto an arm 47 movable over a sector 48 which is fixed upon the top end of the tank and is provided with a row of pin holes 49 so that the vane can be set at a desired angle relative to the plane of the associated partition 41 by fixing the arm 47 at a suitable point of sector 48 by means of a pin 50 inserted through a hole in the arm 47 and a selected registering pin hole 49.

Agitating and mixing means for all the compartments in this embodiment comprise a single submerged horizontal shaft 51 extending in and lengthwise of the tank and through all the partitions 41. This shaft which can be said to be coaxial with a horizontal longitudinal axis of the tank is rotatably mounted in end bearings 52 and 53 provided in respective end walls 39 and 40 of the tank. The shaft is additionally supported in intermediate bearings indicated at 54 and 55 upon some of the partitions 41. The agitating means proper for each compartment are shown to comprise sets or pairs of paddle arms 56, 57, 58 and 59 extending radially from the shaft 51, each pair having their outer ends inter-connected by a horizontally extending paddle member 60, so that in each compartment there is shown to operate a set of four horizontal paddle members 60 adapted with the rotation of shaft 51 to move in repetitive cyclic paths as indicated by the direction of arrow 61 (see Fig. 6). Continuous feed of raw juice into the inlet compartment 42ᵃ of the tank is indicated by a feed pipe 62, while the continuous discharge of treated or limed juice is indicated by an overflow or riser pipe 63 at the outer end of the tank. The continuous introduction of dosing agent or lime into compartment 42ᶠ is indicated by a feed pipe 64.

The liquid level in the tank determined by the elevation of the overflow from pipe 63 is indicated at V¹. The shutter blades 43 are shown to be set at an angle A¹ with respect to the plane of the associated partition 41.

What I claim is:

1. Apparatus for continuously treating sugar juice with a defecating agent which comprises a horizontally extending tank having a raw juice inlet at one end and a treated juice outlet at the other end and adapted to hold a body of juice passing therethrough with the juice level in the tank determined by the elevation of the juice outlet, partitioning means dividing the tank into a series of treatment compartments and having flow passages whereby the compartments communicate with one another and through which a main stream of the juice passes sequentially from the first to the last compartment, agitating means for swirlingly mixing the juice in said compartments while imparting to the juice in each compartment a motion substantially transversely of the direction of the main stream with the direction of such agitation being the same in all zones, flow-splitting devices disposed between any two successive compartments and associated with respective flow passages to effect marginally splitting off a quantity of the swirling juice in each zone except the juice-feeding zone and thereby transferring such quantity carrying some of the reagent through said passage upstream into the next preceding zone there to admix with juice therein while displacing a corresponding quantity of juice downstream from said preceding zone so that the concentration of the reagent in the juice in the zones is greatest in the zone of juice emission and is least in the zone of juice feeding while the concentrations in the zones therebetween diminish from zone to zone from greatest to least, and means for adjusting said flow-splitting devices to regulate the respective quantities being split off.

2. The process of continuously treating sugar juice with an alkaline defecating reagent, which comprises establishing and maintaining a confined body of such juice divided into a series of hydraulically communicating zones, feeding juice to a zone adjacent one end of the body and overflowing emitting treated juice from a zone at the other end whereby there is a main flow of juice sequentially through the zones from first to the last, supplying reagent to the last zone, swirlingly agitating juice in each zone while imparting to the juice in each zone a motion transversely to the direction of main flow of juice with the direction of agitation being the same in all zones, marginally splitting off a quantity of the swirling juice in each zone except the juice-feeding zone and thus transforming such quantity carrying some of the reagent upstream by the pressure of the swirling mass into the next preceding zone there to admix with juice therein while displacing a corresponding quantity of juice downstream from said preceding zone so that the concentrations of the reagent in the juice in the zones is greatest in the zone of juice emission and is least in the zone of juice-feeding while the concentrations in the zones therebetween diminish from zone to zone from greatest to least, and controlling the degree of decrease of concentration from zone to zone by regulating the respective quantities being split off.

3. The process of continuously treating sugar juice with an alkaline defecating reagent, which comprises establishing and maintaining a confined horizontally extending body of such juice divided into a horizontal series of hydraulically communicating zones, feeding juice to a zone adjacent one end of the body and overflowingly emitting treated juice from a zone at the other end whereby there is a general horizontal main flow of juice sequentially through the zones from the first to the last, supplying reagent to the last zone, swirlingly agitating the juice in each zone while imparting to the juice in each zone a motion transversely to the direction of main flow with the direction of agitation being the same in all zones, marginally splitting off a quantity of the swirling juice in each zone except the juice-feeding zone and thus forcing such quantity carrying some of the reagent upstream by the pressure of the swirling mass into the next preceding zone to admix with juice therein so that the concentration of the reagent in the juice in the zones is greatest in the zone of juice-emission and is least in the zone of juice-feeding while the concentrations in the zones therebetween diminish from zone to zone from greatest to least, and controlling the degree of decrease of concentration from zone to zone by regulating the respective amounts of the quantities being split off.

4. Apparatus for continuously treating sugar juice with a defecating agent which comprises a horizontally extending tank having a raw juice inlet at one end and a treated juice outlet at the other end and adapted to hold a body of juice passing therethrough with the juice level in the tank determined by the elevation of the juice outlet, partitioning means dividing the tank into a series of treatment compartments communicating with one another through which a main stream of the juice passes sequentially, agitating devices for swirlingly mixing the juice in said compartments while imparting to the juice in each compartment a motion substantially transversely of the main stream, and flow-intercepting and diverting deflector means disposed at the top of the respective partitioning means and in adjustable angular flow-intercepting relationship with respect to the transverse path of the juice whereby a quantity of swirling juice in each compartment except the juice-feeding compartment is diverted into the next preceding compartment there to admix with juice therein, the diverted quantity carrying some reagent, said deflector means being adjustable for adjusting said diverted quantities so that the concentration of the reagent in the juice compartments is greatest at the juice outlet and is least at the juice inlet while the concentrations in the compartments therebetween diminsh from compartment to compartment from greatest to least.

5. Apparatus according to claim 4, in which the deflector means comprise shutter devices adjustable for closing the communications between the compartments whent he flow of juice through the tank is stopped.

6. Apparatus according to claim 4, in which the deflector means comprise vertical two-winged shutter blades adjustable for closing the communications between the compartments when the flow of juice through the tank is stopped.

7. Apparatus according to claim 4, in which the mixing means comprise a rotary shaft extending longitudinally of the tank through said compartments and through said partitioning means with paddle means mounted upon the shaft adapted by its rotation to impart transverse motion to the juice, and in which said deflector means comprise vertical two-winged shutter blades adjustable for closing the communications between the compartments when the flow of juice through the tank is stopped.

ARNE VIGAND BRIEGHEL-MÜLLER.

REFERENCES CITED

The following references are of record in the file of this patent:

UNITED STATES PATENTS

| Number | Name | Date |
|---|---|---|
| 1,573,733 | Morse | Feb. 16, 1926 |
| 1,800,667 | Shafor | Apr. 14, 1931 |
| 2,282,265 | Swallen | May 5, 1942 |

FOREIGN PATENTS

| Number | Country | Date |
|---|---|---|
| 265,464 | Italy | June 15, 1929 |
| 590,850 | Germany | Jan. 11, 1934 |